United States Patent

Oliver

[11] 4,136,278
[45] Jan. 23, 1979

[54] METHOD AND APPARATUS FOR PULSED NEUTRON SPECTRAL ANALYSIS USING SPECTRAL STRIPPING

[75] Inventor: Donald W. Oliver, Houston, Tex.
[73] Assignee: Dresser Industries, Inc., Dallas, Tex.
[21] Appl. No.: 815,640
[22] Filed: Jul. 14, 1977
[51] Int. Cl.² ............................................. G01V 5/00
[52] U.S. Cl. .................................. 250/269; 250/263; 250/270
[58] Field of Search ................. 250/262, 263, 269, 270

[56] References Cited

U.S. PATENT DOCUMENTS 3,940,610  2/1976  Dennis et al. ...................... 250/262

Primary Examiner—Alfred E. Smith
Assistant Examiner—Janice A. Howell
Attorney, Agent, or Firm—Albert M. Crowder, Jr.

[57] ABSTRACT

A pulsed neutron generator in a well logging instrument is pulsed at a clock frequency of 20 KHz. Inelastic scatter gamma rays are detected during a first time interval coinciding with the neutron source being on and capture gamma rays are measured during a second interval subsequent to the end of each neutron burst. Only a single detected pulse, assuming detection occurs, is transmitted during each of the two detection intervals. Sync pulses are generated in the well logging instrument scaled down to a frequency of 200 Hz for transmission to the earth's surface. At the earth's surface, the scaled-down sync pulses are applied to a phase-locked loop system for regenerating the sync pulses to the same frequency as that of the clock frequency used to pulse the neutron source and to open the detection gates in the borehole instrument. The regenerated sync pulses are used in the surface instrumentation to route the pulses occurring in the inelastic interval into one section of a multichannel analyzer memory and the pulses occurring in the capture interval into another section of the multichannel analyzer. The use of memory address decoders, subtractors and ratio circuits enables both a carbon/oxygen ratio and a silicon/calcium ratio to be struck substantially free of background radiation and substantially unaffected by downscattering of high energy gamma rays.

13 Claims, 12 Drawing Figures

METHOD AND APPARATUS FOR PULSED NEUTRON SPECTRAL ANALYSIS USING SPECTRAL STRIPPING

BACKGROUND OF THE INVENTION

This invention relates generally to radiological well logging methods and apparatus for investigating the subsurface earth formations traversed by a borehole and, more specifically, relates to an improved system for pulsed neutron gamma ray logging methods and apparatus wherein gamma rays resulting from neutron inelastic scattering and thermal neutron capture are selectively detected and the spectral distribution of the gamma rays is determined in conjunction with the stripping of downscattered high energy gamma rays.

The selective detection of characteristic gamma rays emanating from earth elements undergoing neutron bombardment is appreciated by those skilled in the art as a method for identifying such elements. More specifically, the detection of gamma rays from carbon, oxygen, silicon, calcium and certain other elements enables the identification of the general rock types in formations traversed by boreholes and the determination of the presence or absence of hydrocarbons within their pore spaces. To identify these elements, both high and low energy reactions must be detected; thus, the neutron source must be pulsed and measurements made during the neutron burst when high energy reactions occur and between bursts when thermal capture reactions occur. Hence, the detector and neutron source must be synchronized.

In well logging applications, the neutron source and detector in the subsurface instrument are connected to the surface analyzing and recording equipment by 20,000 or more feet of cable which carries power, control and detector signals. Since the amplitude of the detector pulses varies in proportion to the energy of the detected gamma rays, the logging cable must not significantly degrade the energy resolution of the system. The seven-conductor cables which are widely used in the well logging industry have been found to be generally acceptable for gamma ray spectral analysis despite their poor high frequency response. The detector and sync pulses applied to the subsurface end of the logging cable are widened during their transit over the line and are several microseconds wide when they reach the surface end of the cable. Typically, a unipolar pulse which is two to three microseconds wide at the subsurface end of a 20,000 foot cable will be 10 to 12 microseconds wide at the surface end. While this time spreading is of little significance at low source pulsing frequencies, it does place an upper limit on the usable source pulsing frequency if a synchronization pulse is transmitted each time the source is pulsed. Furthermore, it should be appreciated that a high pulsing frequency is desirable for the inelastic detection systems in order to obtain the counting rates appropriate for good statistical accuracy. Since the pulses are spread in time by their transit over the logging cable, there is a greater probability of pulse pile-up on the line than in the gamma ray detector itself. In order to eliminate detector pulse pile-up on the line, it has already been found desirable to incorporate the circuit described in U.S. Pat. No. 3,739,172, assigned to the assignee of this application, which allows only one pulse per gate interval to be fed to the cable for transmission to the surface. Such a circuit allows a pulse which occurs as late as 100 nanoseconds before the end of the gating interval to be transmitted as a full width pulse.

By example, if a 10 microsecond wide neutron burst and a 10 microsecond wide inelastic detector gate are used with a 10 microsecond wide capture gate in a system pulsed at 20 KHz, there is little time left in the repetition period for a sync pulse to be transmitted. This is because the detector pulses from a particular detector gate fall within a 20 to 22 microseconds wide interval at the receiving end of the cable. This time is the sum of the 10 microsecond wide detector gate and the 10 to 12 microsecond wide pulses received at the surface since the pulse may well occur right at the end of the detector gate interval. With lines shorter than 20,000 feet, the time spreading is correspondingly less.

To use these neutron bursts and detector gate widths and allow a small safety margin against coincidence, it would be necessary to increase the pulsing and detection period to about 60 microseconds. Since one of the problems with inelastic gamma ray well logging systems is that of obtaining sufficient counting rates to produce a statistically accurate measurement, it is desirable to operate at the higher pulsing frequency, for example, 20 KHz, having a pulsing and detection period of 50 microseconds.

High energy gamma rays, incident upon a NaI (Tl) scintillation counter, can be downscattered in the crystal and counted as a lower energy pulse. In the case of systems for determining a carbon-oxygen ratio, gamma rays from oxygen can be degraded and appear in the energy interval used to measure the carbon gamma rays. Tests have shown that about as many oxygen gamma rays are counted in the carbon interval as are recorded in the oxygen interval. Therefore, it has been determined in accordance with the present invention that subtracting or "stripping" all or a portion of the oxygen gamma rays from the gamma rays recorded in the carbon interval will improve the sensitivity to oil in the carbon/oxygen logging instrument.

It is therefore the primary object of this invention to provide new and improved method and apparatus for reducing the effect of downscattered gamma rays upon spectral analysis well logging systems;

It is also an object of the present invention to provide new and improved method and apparatus for increasing the carbon/oxygen sensitivity between water-filled and oil-filled porosity measurements in well logging systems.

The objects of the invention are accomplished, generally, by method and apparatus which subtract at least a portion of the downscattered high energy gamma rays from the spectrum of interest being analyzed in a well logging system.

These and other objects, features and advantages of the present invention will be more readily understood by those skilled in the art from a reading of the following detailed specification and drawing, in which:

FIG. 1 is a side elevation, partly in cross section, of a borehole logging instrument in operative position and its associated surface circuitry and related equipment;

FIG. 2 schematically illustrates, in cross section, a seven-conductor well logging cable;

Figure 10:
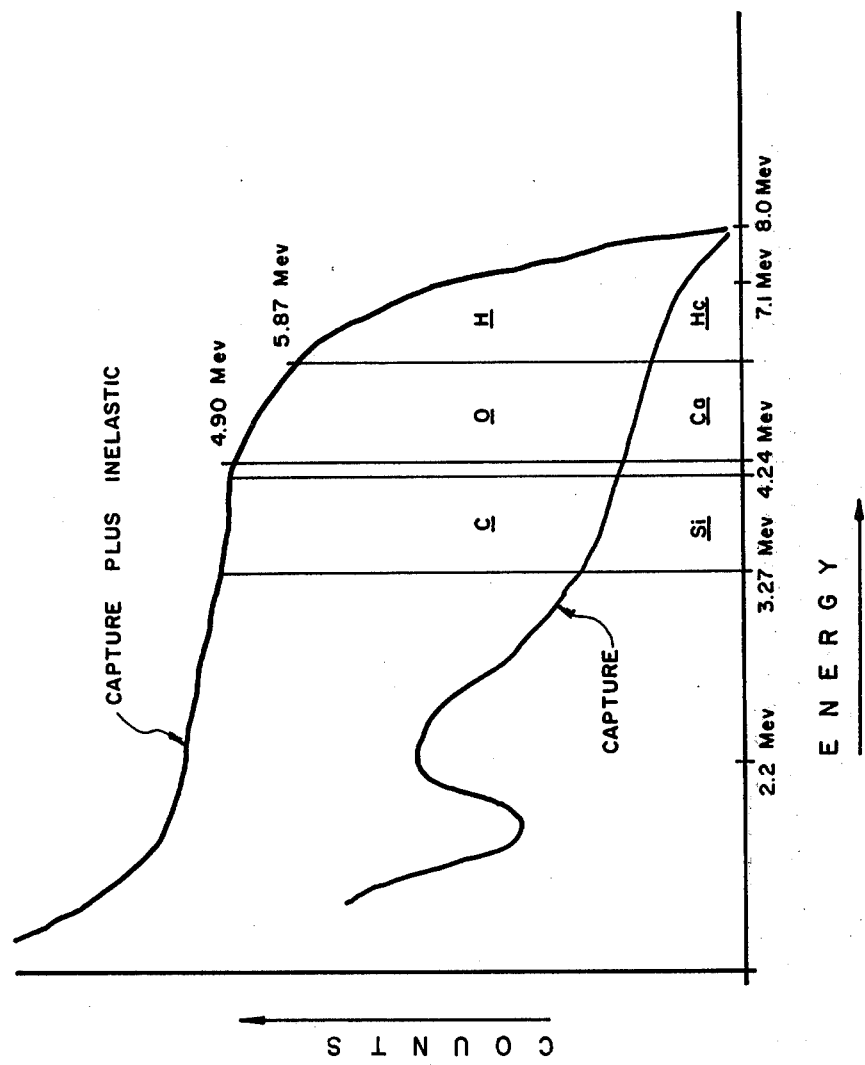
Figure 11:
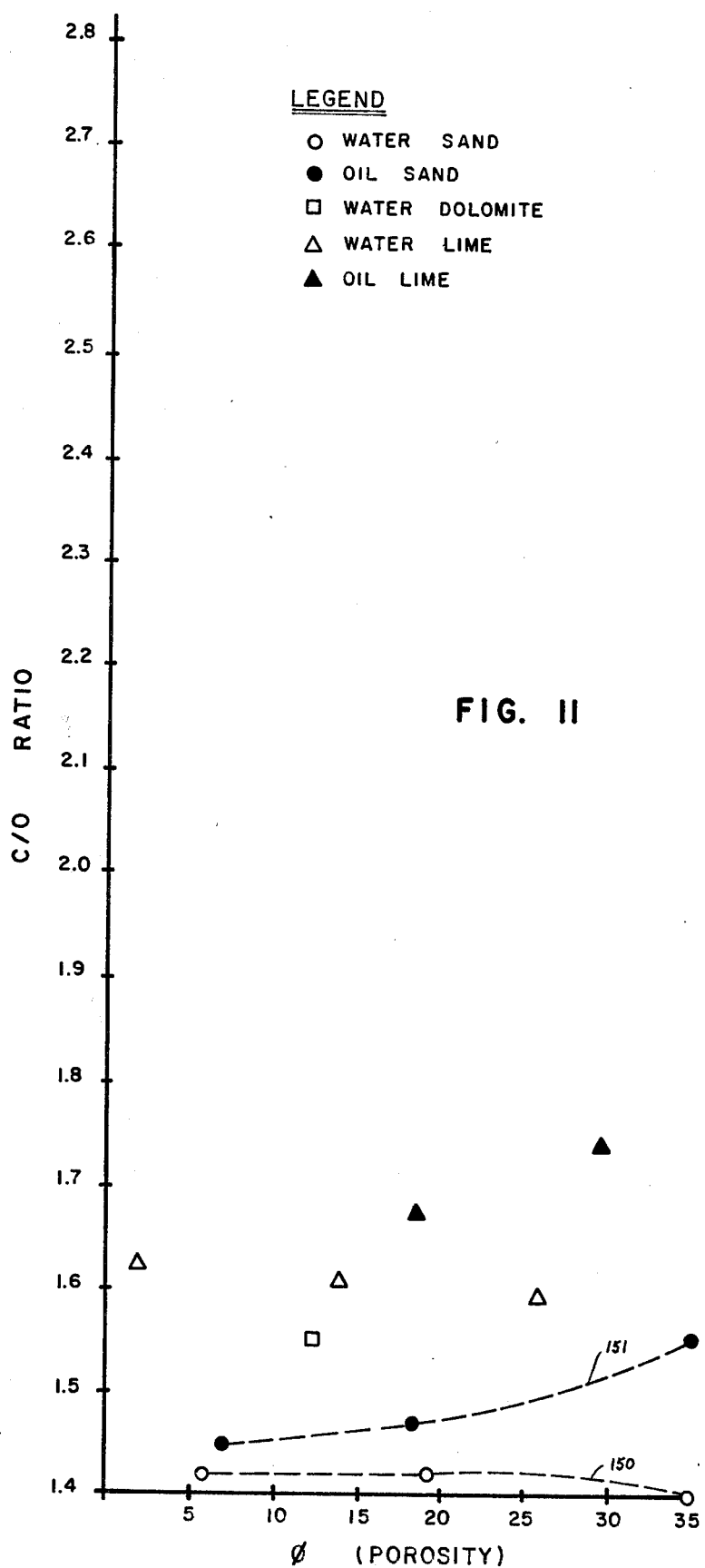
Figure 12:
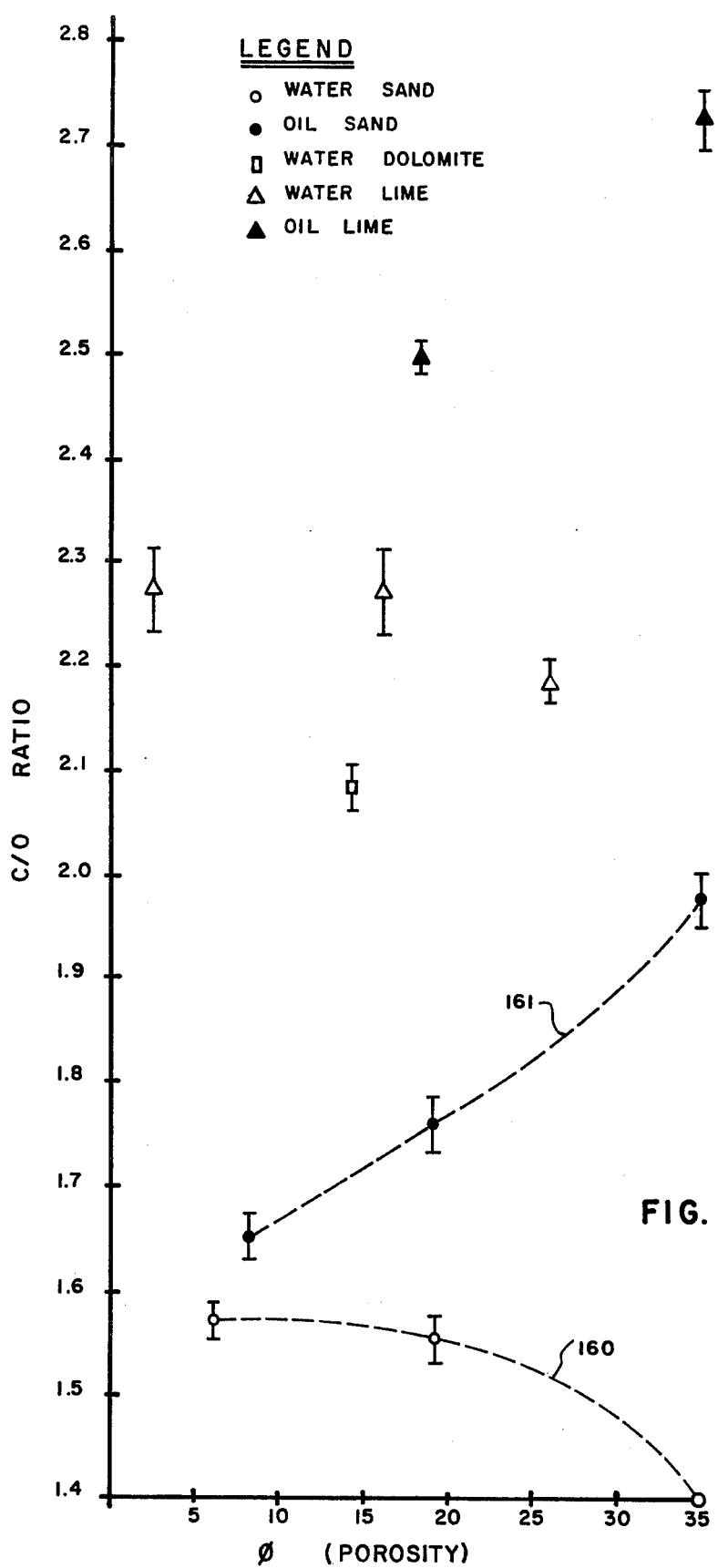

FIGS. 6, 7, 8 and 9 schematically illustrate waveforms representative of the various signals appearing in the surface and subsurface circuitry in accordance with the present invention;

FIG. 10 graphically illustrates a portion of a spectral curve plotting radiation counts versus the energy levels of various high energy gamma rays;

FIG. 11 graphically illustrates spectral data in accordance with the prior art which has not been stripped; and FIG. 12 graphically illustrates spectral data which has been stripped in accordance with the present invention.

Figure 1:
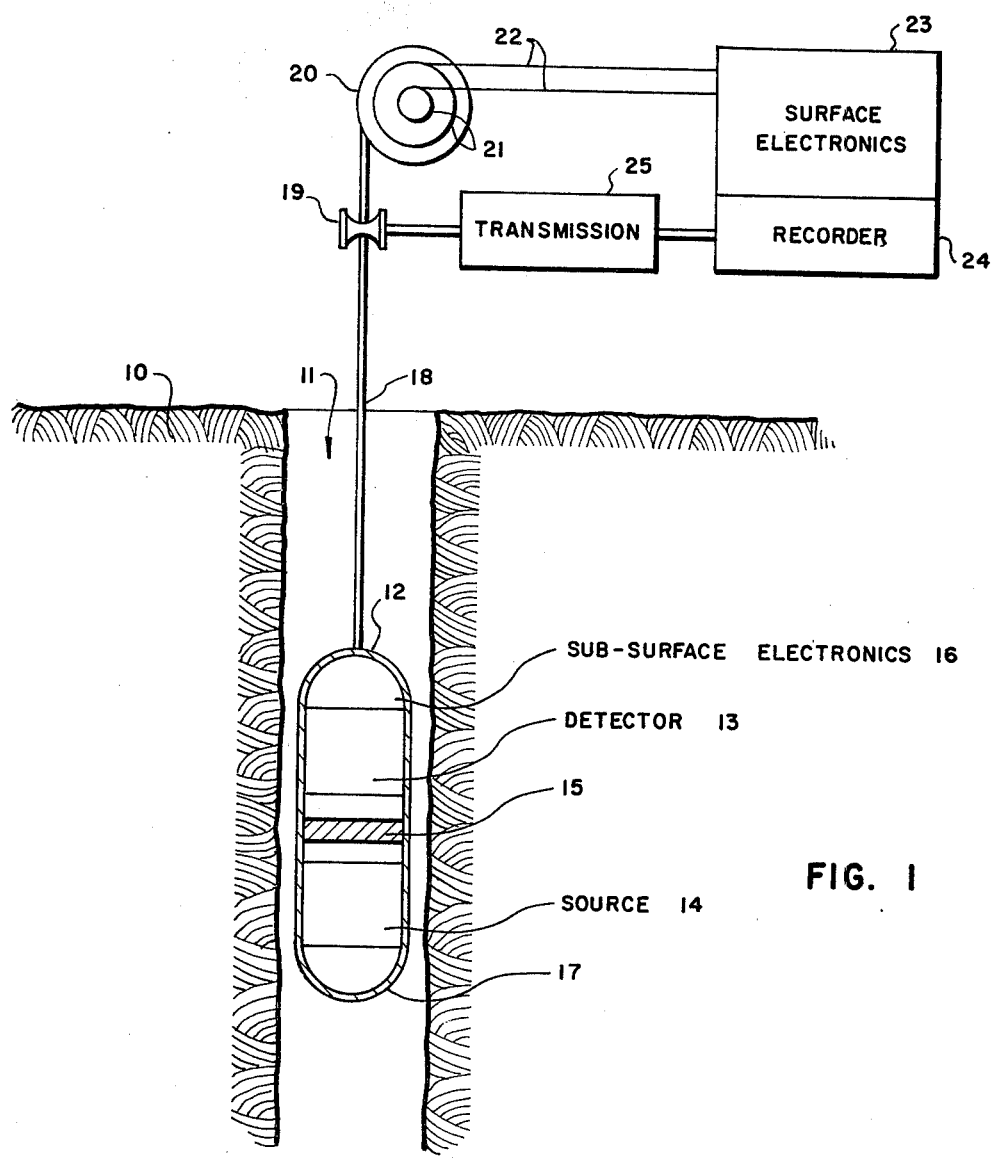

Referring now to the drawing in more detail, particularly to FIG. 1, there is illustrated schematically a radioactivity well surveying operation in which a portion of the earth 10 is shown in vertical section. A well 11 penetrates the earth's surface and may or may not be cased. Disposed within the well is subsurface instrument 12 of the well logging system. Subsurface instrument 12 comprises a detecting system 13 and a pulsed neutron source 14. Cable 18 suspends the instrument in the well and contains the required conductors for electrically connecting the instrument with the surface apparatus. The cable is wound on or unwound from drum 20 in raising and lowering the instrument 12 to traverse the well.

In making a radioactivity log of the well, instrument 12 is caused to traverse the well. Thereby neutrons from source 14 irradiate the formations surrounding the borehole and radiations influenced by the formations are detected by the detecting system 13. The resultant signals are sent to the surface through cable 18. Through slip rings 21 on the end of the drum, the signals are conducted to the surface electronics 23, where such signals are processed and then recorded on the recorder 24 as explained in more detail hereinafter. Recorder 24 is driven through a transmission 25 by measuring reel 19 over which the cable 18 is drawn so that recorder 24 moves in correlation with depth as the instrument 12 traverses the well. The elements are shown diagrammatically, and it is to be understood that the associated circuits and power supplies are provided in a conventional manner. It is also to be understood that the instrument housing 17 will be constructed to withstand the pressures and mechanical and thermal abuses encountered in logging a deep well and provide adequate space within it to house the necessary apparatus and permit the transmission of radiation through it. The subsurface signals are processed in the subsurface electronics 16, described in greater detail hereinafter, and after surface signals are taken off the slip rings 21, they are sent to the surface electronics 23 by means of the conductors 22.

Figure 2:
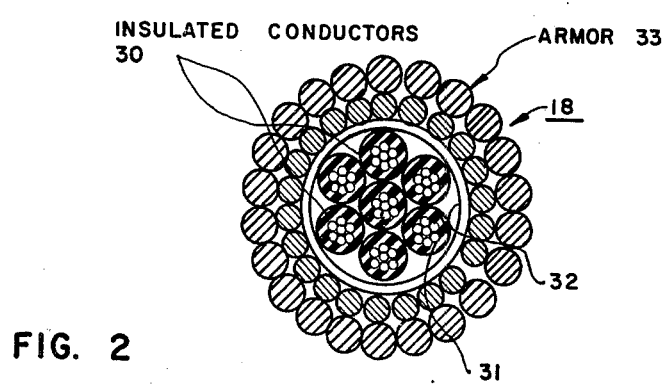

In FIG. 2, there is illustrated a conventional seven-conductor logging cable 18 which normally has a central conductor 31 around which six additional conductors 30 are wrapped. The conductors 30 are covered by an insulation sheath 32 and by an outer armor 33 for mechanical strength.

In well logging operation such as is illustrated by the apparatus of FIG. 1, the neutron source and detector in the subsurface instrument 12 are separated from the surface processing and recording equipment 23 by as much as four to five miles of logging cable which carries power and signals. Synchronization pulses must be transmitted along with the detector signals to provide the means for synchronizing the surface processing equipment with the subsurface generating and detecting system. Those skilled in the art recognize the advantages of using a multi-conductor cable such as is illustrated in FIG. 2 for interconnection with the subsurface and surface instruments, particularly with systems for induction-electric and acoustic measurements. It is also desirable to use such cables with pulsed neutron spectral analysis systems, and since the frequency response of the outer conductors 30 is poorer than that of the inner conductor 31, it has been found to be convenient to use the center conductor for signal transmission and the outer conductors for power and control lines.

The sync pulse received at the surface of the 20,000 odd feet of logging cable commonly encountered in the well logging industry has a width of about ten microseconds due to the poor high frequency response of the cable. At low repetition frequencies, for example, 2,000 Hz or less, the transmission of a sync pulse for each neutron burst is not particularly difficult; however, at high repetition rates, for example, 20 KHz, the sync pulse represents an appreciable amount of the repetition period. If, however, the sync pulses are scaled and transmitted only one or two percent of the time, a significant improvement results since the sync is regenerated at the surface by use of a phase coherent, phase-locked loop.

Figure 3:
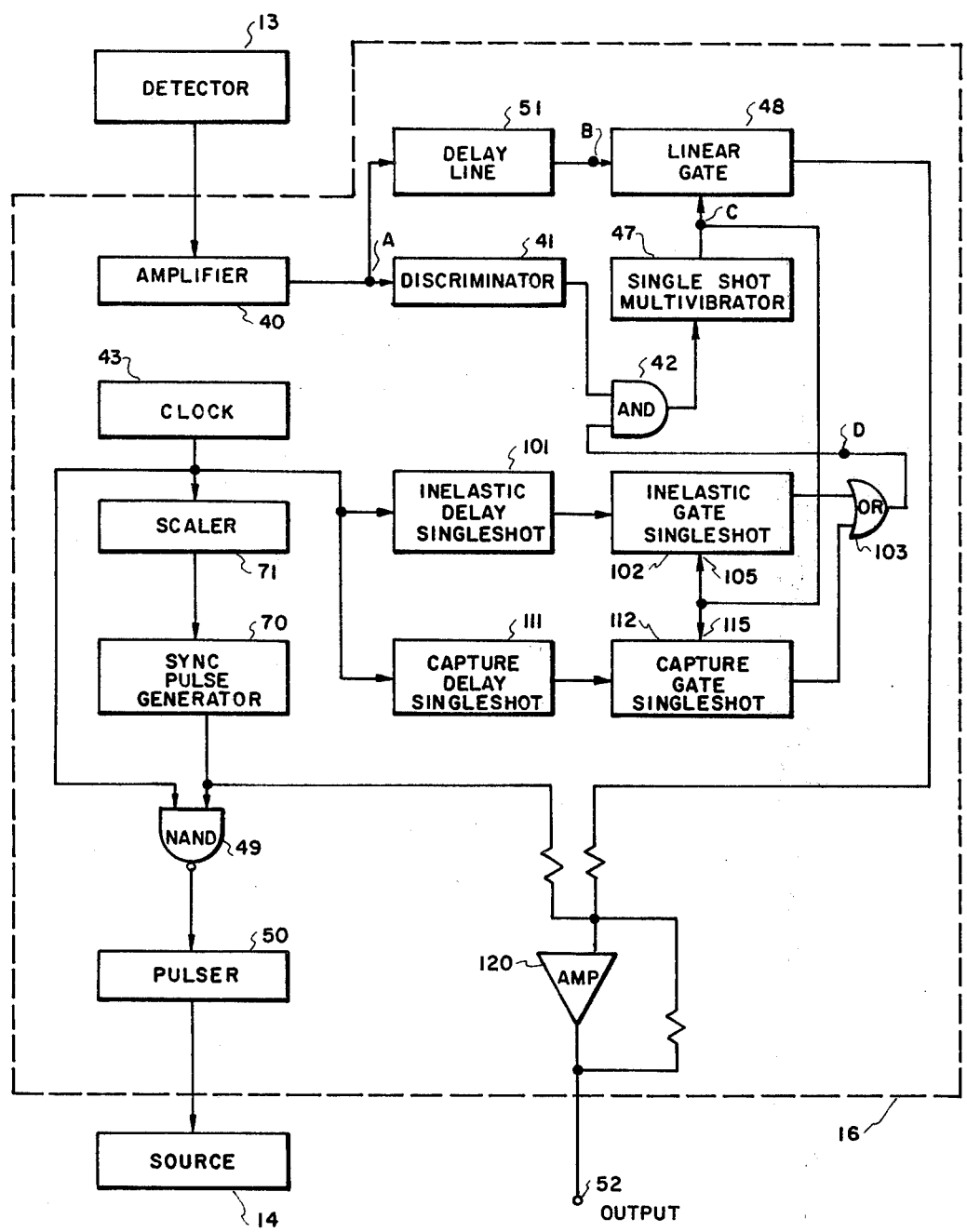
FIG. 3 is a block diagram of the subsurface circuitry according to the present invention.

FIG. 3 illustrates the subsurface apparatus and circuitry for generating the neutron source signals, the radioactivity detector signals, and the scaled sync signals for transmission to the earth's surface.

Referring now to FIG. 3, there is illustrated in block diagram the subsurface electronics section 16, as connected to the detector 13. The detector 13 is a scintillation counter arranged for gamma ray spectral analysis in accordance with the prior art. In a preferred embodiment, it is a NaI (Tl) crystal having a 2½ inch diameter with a 4 inch length, such crystal being coupled to a Model No. 4523 photomultiplier tube available from The Radio Corporation of America. Such a crystal-photomultiplier combination may have a resolution of 7.5% to 8.5% for the 660 kev cesium 137 peak. The detector is mounted in a Dewar flask or is otherwise protected from high temperatures encountered in boreholes. The output of the detector 13 combination is coupled into an amplifier 40 within the subsurface electronics section 16. The output of amplifier 40 is coupled to a discriminator 41 which in turn is coupled into one of the two inputs of the AND gate 42. The discriminator 41 is used to remove pulses having amplitudes below a selectable threshold value which might otherwise cause pile-up on the transmission line normally connected to the output terminal 52. A setting of 400 kev is generally suitable for this purpose. The output of the discriminator 41 is AND gated in the AND gate 42 with a voltage pulse having a nominal width of ten microseconds from the OR gate 103. The output of the AND gate 42 triggers the single shot multivibrator circuit 47 which is nominally set to have a 1.6 microsecond wide pulse output for controlling the linear gate 48. The output from clock 43 triggers the inelastic delay single shot multivibrator circuit 101 which in turn triggers the inelastic gate width single shot multivibrator circuit 102. These circuits synchronize the opening of linear gate 48 with the pulsing of the neutron source to provide the inelastic gating interval. Multivibrator 102 is a retriggerable type with a "clear" input 105. The operation of the circuit is such that if a trigger pulse is applied before the end of the cycle initiated by a previous trigger pulse, the cycle time will begin anew. Also, after the circuit is initiated by a trigger pulse, the Q output will remain high until the end of the cycle time or until a "clear" pulse is applied, whichever occurs first. The output of single shot 102 is coupled to one input of OR gate 103. The "clear" input 105 of single shot 102 is driven by the output of single shot 47. The result of this "clear" signal is to reset inelastic gate single shot 102 as soon as the first gamma ray with energy above the discriminator threshold is detected. By using a multivibrator circuit with a "clear" function for gate single shot 102, a dual function is performed. Firstly, the single shot provides the gate width timing signal for determining the maximum length of the inelastic detection gate, nominally 10 $\mu$sec; and secondly, it provides for terminating the gate when the first gamma ray pulse above the discriminator threshold is detected, a function performed by a J-K flip-flop in U.S. Pat. No. 3,739,172, assigned to the assignee of the present application.

The output from clock 43 is also connected to capture delay single shot 111 which in turn drives capture width single shot 122 which also has a "clear" input and whose output is coupled to the second input of OR gate 103. The "clear" input terminal 115 of single shot 112 is also driven by the output of single shot 47. The clock 43 is also synchronized with the neutron source 14. The pulse from the clock 43 actuates, by means of a NAND circuit 49, a high voltage pulser 50 arranged to cause the neutron output of source 14 to pulse at the clock frequency as described in U.S. Pat. No. 3,309,522.

The amplified pulses from the amplifier 40 are also coupled into a delay line 51, which is nominally set to cause a delay of 0.4 microseconds, the output of which is coupled into the linear gate 48.

The output of the clock circuit 43 is also coupled into a scaler circuit 71 which produces output pulses at a frequency scaled down from that of the clock frequency. In the preferred embodiment, the clock 43 operates at a frequency of 20 KHz and the scaler circuit 71 produces pulses at a frequency of 200 Hz. The output of the scaler 71 is coupled to a sync pulse generator 70 which shapes the pulses for application to the line amplifier 120 and NAND gate 49. Thus, the scaled sync pulses are generated at a frequency which is 1% of that of the clock frequency 43. The scaled sync pulses from the sync pulse generator 70 are coupled into the second input of the NAND gate 42. Thus, whenever a sync pulse appears on the NAND gate 49 input coincident with a pulse from the clock circuit 43, there is no output produced from the NAND gate 49 and the neutron source 14 is not pulsed. In short, the source 14 pulses every time the clock 43 pulses except for those times when the scaled sync pulses are produced.

In addition to the scaled sync pulses, the output from linear gate 48 is coupled to the line amplifier 120 which in turn is coupled to line 18 by connection to terminal 52.

In the operation of the circuitry of FIG. 3, it should be readily apparent that the circuitry involved with the single shot 111 and the single shot 112 are duplicates of the circuitry involving the single shot 101 and the single shot 102. The difference lies in the time constant of each circuit which allows there to be two gating intervals which are separated in the preferred embodiment by a delay of 25 microseconds from the beginning of the first to the beginning of the second. As will be explained hereinafter, the first gating interval occurs during the time the neutron source is turned on and allows for the detection of radioactivity resulting from inelastic scattering and the second gating interval allows for the measurement of neutron capture resulting from the pulsing of the neutron source.

Figure 9:
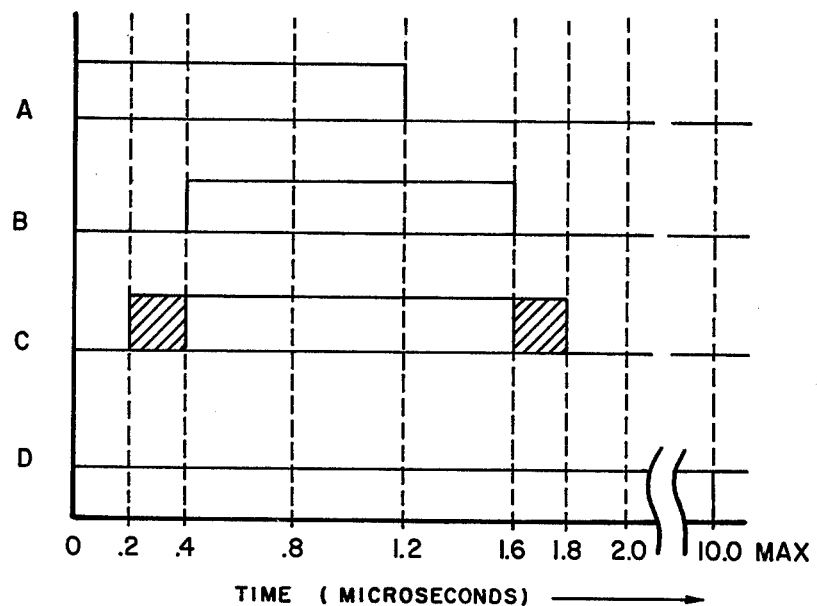

The operation of the portion of the circuitry of FIG. 3 utilizing the discriminator 41, the delay circuit 51, and the resettable single shot circuit 102 can best be explained by reference to FIG. 9, wherein various waveforms appearing in that portion of the circuitry of FIG. 3 are graphically illustrated. In FIGS. 3 and 9, the pulse appearing at point A, having a duration of 1.2 microseconds, is representative of the output of the amplifier 40. The pulse appearing at point B is representative of the output of the delay line 51. The point C is representative of the output of the single shot multivibrator 47. The point D is representative of the output from OR gate 103. It should be appreciated from observing the pulse waveforms of FIG. 9 that the linear gate 48 is open approximately 200 nanoseconds before the arrival of the detector pulse and closes about 200 nanoseconds after the detector pulse passes through the linear gate 48. The 200 nanoseconds factor is shown by the cross-hatched areas on the waveform of point C in FIG. 9. It should also be appreciated that the first detector pulse exceeding the threshold of the discriminator 41 and commencing within the time interval of the gate pulse from the OR gate 103 is passed by the linear gate 48 to the amplifier 120. It should also be appreciated that by AND gating the 10 microsecond pulse from the OR gate with the discriminator output to provide the trigger for the single shot multivibrator which in turn controls the opening of the linear gate, rather than triggering the single shot multivibrator from the discriminator and gating the single shot multivibrator output and the OR gate pulse for the linear gate control signal, a detector pulse occurring near the end of the clock pulse interval is passed as a full width pulse instead of being chopped off as would otherwise occur. It should also be appreciated that the single shot 102 is reset on the leading edge of the output pulse from single shot 47, disabling AND gate 42. Thus, the first, and only the first, detector pulse occurring during the interval determined by single shot 102 is passed by the linear gate 48. Again, the pulse output from the linear gate 48 is full width, even should it occur late within the clock interval.

As hereinabove set forth, the circuitry associated with the second gating interval, i.e., the discriminator 41, the delay line 51 and the single shot circuit 111, etc., etc., operates in a substantially identical manner with that above described except the delay of circuit 111, having a nominal time constant of 25 microseconds, enables the neutron capture radiation to be detected but again only a single pulse is passed occurring within the 10 microsecond gate interval determined by single shot 112. These pulses are passed through the linear gate 48 to the amplifier 120 and the pulse output from the linear gate 48 again is full width, even should it occur late within the gate interval.

Figure 6:
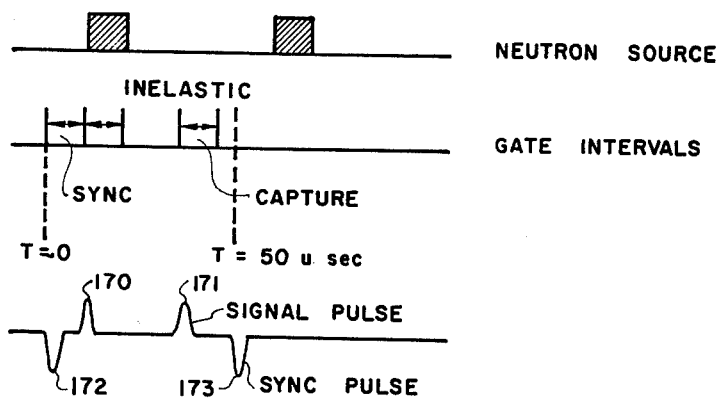
Figure 7:
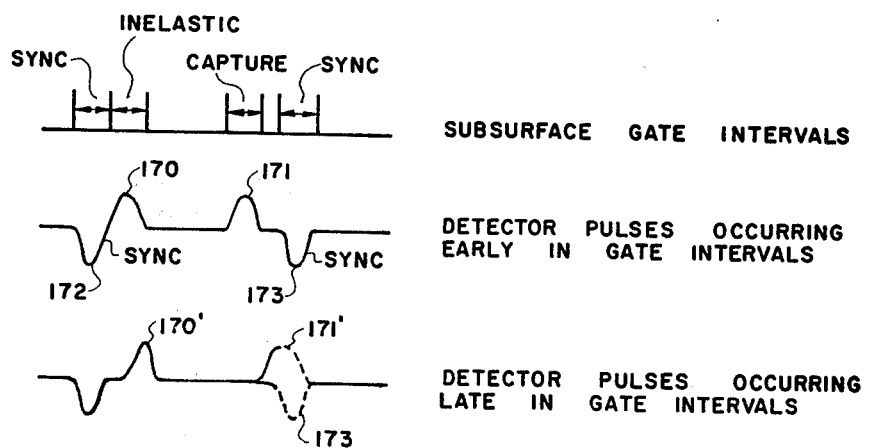

The diagrams shown in FIGS. 6 and 7 are exemplary of the relationship of the neutron source pulses, the gate intervals and the detected pulses occurring during the gate intervals. In FIG. 6, the inelastic gate interval occurs during the time the neutron source is turned on and the capture interval, being nominally 10 microseconds long, commences 15 microseconds after the termination of the inelastic gating interval. In FIG. 6, the detector pulse 170 is indicative of inelastic scattering which is detected during the inelastic gate interval and the pulse 171 is indicative of neutron capture occurring during the capture gate interval. The sync pulses 172 and 173 can be made to occur during the 10 microseconds preceding the neutron source being turned on if desired and, when so done, will occur as illustrated in FIG. 6. However, as illustrated in FIG. 7, the pulses are stretched out, as compared to the narrow pulses illustrated in FIG. 6, after they reach the earth's surface over the long logging cable. Thus, with the high frequency use, the sync pulses 172 and 173 can easily interfere with the detected pulses 170 and 171. This is especially true when the detector pulses occur late within the gate interval such as illustrated by the numerals 170' and 171'. As shown by the dotted line portion, the detector pulse 171' coincides in time with a portion of the sync pulse 173 and one of two things happens. If the sync pulse is of opposite polarity, the two pulses tend to cancel out, and if the sync pulse is of the same polarity (not illustrated), such random coincidences will only add to the amplitude of the sync pulses. Thus, it becomes quite difficult when using such circuitry to avoid interference between the sync pulses and the detected pulses.

Figure 4:
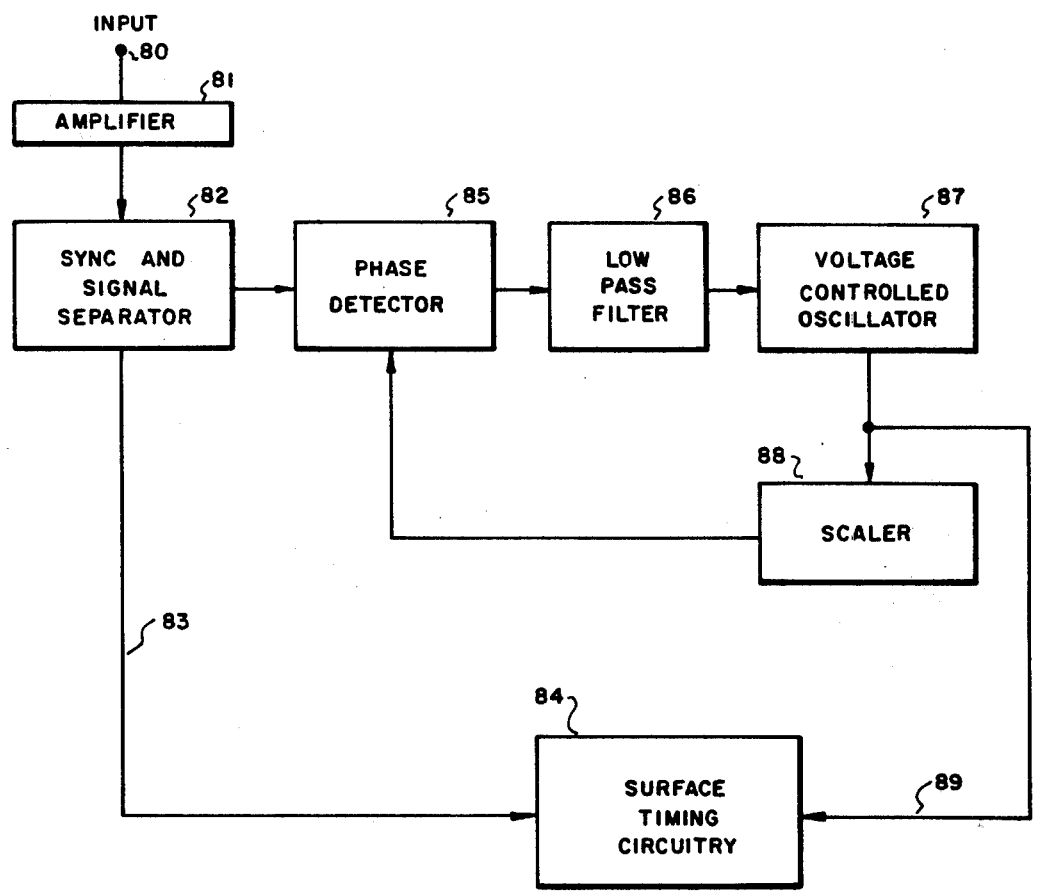
FIG. 4 is a block diagram of the surface circuitry according to the present invention.

Referring now to FIG. 4, the surface electronics circuitry 23 is illustrated in greater detail. The input terminal 80 in the surface electronics 23 which receives the pulses from the logging cable is coupled into an amplifier 81 whose output is coupled into a conventional sync and signal separator circuit 82. Quite obviously, if the sync and signal pulses are of opposite polarity, they can be separated by polarity-sensitive circuitry and if they are of the same polarity, they can be separated by a voltage discriminator circuit well known in the art. The preferred embodiment contemplates that the sync is transmitted with a polarity opposite from that of the detected pulses and the neutron source is not pulsed during the scaled sync transmission interval so that random coincidences do not annihilate the sync. If desired, the detector gate intervals can also be gated off during the sync transmission interval. The detector signals are coupled out of the sync and signal separator by conductor 83 into the surface timing circuitry 84 which is described in greater detail hereinafter.

The sync pulses from the sync and signal separator circuit 83 are coupled into a phase detector circuit 85, the output of which is coupled into a low pass filter 86 and then into a voltage controlled oscillator 87. The output of the voltage controlled oscillator 87 is coupled into a scaler 88 and also into the surface timing circuitry 84 by conductor 89. The output of the scaler circuit 88 is coupled back into phase detector circuit 85.

In the operation of the circuitry of FIG. 4, the combined sync and signal pulses are fed into the sync separator 82 where the sync pulses are separated and shaped to provide a reference frequency for the phase detector circuit 85. The phase detector output is filtered and used as the controlling voltage for the voltage controlled oscillator. The oscillator output is scaled by a frequency divider and fed to the second input of the phase detector circuit 85. When the loop is in lock, the voltage controlled oscillator output frequency is equal to the product of the reference input frequency and the scaler ratio. Thus, if the subsurface system runs at a clock frequency of 20 KHz and the sync pulses are scaled and transmitted at a 200 Hz rate, a scaler of 100 (scaler 88) will provide a 20 KHz output from the voltage controlled oscillator. This 20 KHz signal, now in phase lock with the subsurface clock, provides the synchronization between the subsurface and the surface systems. Thus, it can be seen that this system extends the upper usable pulsing frequency while maintaining a fairly safe margin against random coincidence between the sync pulses and the signal pulses. The design criteria for phase-locked loop systems is well known and specially-designed and integrated circuits are available for their implementation. See, for example, the *Phase-Locked Loop Data Book*, Second Edition, August, 1973, published by Motorola, Inc.

Figure 5:
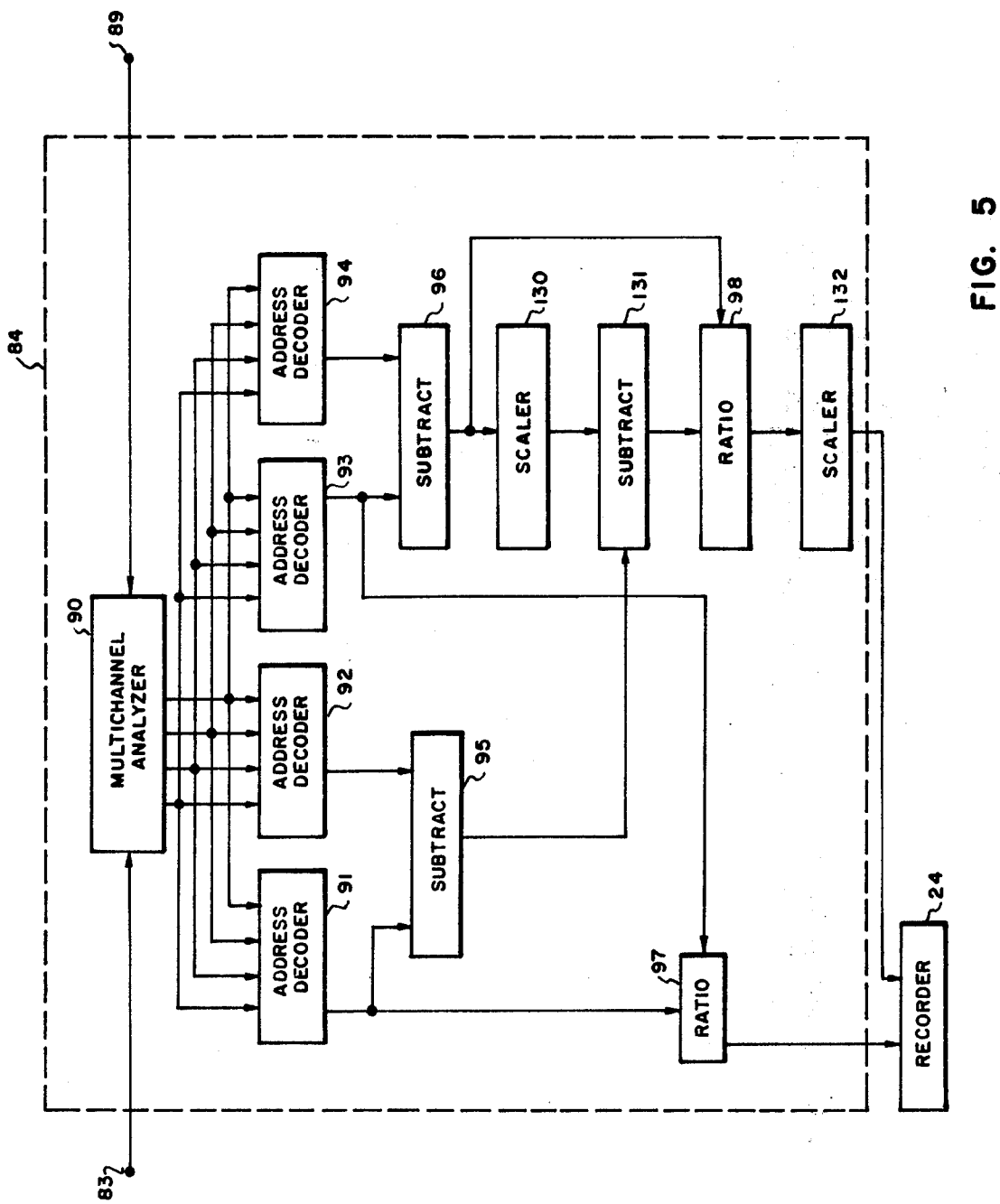
FIG. 5 is a block diagram showing in greater detail a portion of the surface circuitry illustrated in FIG. 4.

Referring now to FIG. 5, the surface timing circuitry 84 of FIG. 4 is shown in greater detail. The conductors 83 and 89, illustrated in FIG. 4, are coupled into a multichannel analyzer 90 having four outputs which are each connected into four address decoders identified by the numbers 91, 92, 93 and 94. The output of the address decoders 91 and 92 are coupled into a subtract circuit 95 and the output of the decoders 93 and 94 are coupled into a subtract citcuit 96. The outputs of decoders 91 and 93 are also coupled into a ratio circuit 97. The output of subtract circuit 96 is coupled into a scaler circuit 130 and also into a ratio circuit 98. The output of the scaler circuit 130 is connected to a subtract circuit 131 which has as one of its inputs the output of subtract circuit 95. The output of subtract circuit 131 is also coupled into the ratio circuit 98. The output of the ratio circuit 98 is connected to the input of the scaler circuit 132 whose output is recorded on the recorder 24. The output of the ratio circuit 97 is also recorded on the recorder 24. The operation of the multichannel analyzer and the address decoders is explained in greater detail in U.S. Pat. No. 4,013,874, issued on Mar. 22, 1977, and assigned to the assignee of the present application.

In the preferred embodiment illustrated and described herein, the address decoder 91 and the address decoder 92 are each configured to measure pulses in the 3.27 to 4.24 Mev band, The address decoders 93 and 94 are configured to measure pulses in the 4.90 to 5.87 Mev band. As is well known, a carbon inelastic gamma ray has several peaks, but one occurs at 3.9 Mev and will fall within the carbon band measured between 3.27 and 4.24 Mev. Likewise, an oxygen inelastic gamma ray has one peak at 5.8 Mev which will fall between the range of 4.90 and 5.87 Mev. These bands are illustrated in FIG. 10 of the drawing.

In the operation of the circuitry of FIG. 5, by putting the outputs from the decoders 91 and 92 into the subtraction circuit 95, the capture time interval is subtracted from the inelastic time interval data to remove the capture background from the inelastic data. This results in the output of the subtraction circuit 95 being related to the carbon inelastic gamma rays with no capture background to disturb the data. In a similar manner, by putting the output from the decoders 93 and 94 into the subtraction circuit 96, the capture background is subtracted from the inelastic oxygen gamma rays to produce an output from the subtraction circuit 96 due to the inelastic oxygen gamma rays. At this point, however, there has been no compensation for the effect of high energy downscattered gamma rays. As previously stated, gamma rays from oxygen can be degraded and appear in the energy level used to measure carbon gamma rays. In fact, it has been determined that about as many oxygen gamma rays are counted in the carbon interval as are recorded in the oxygen interval. By subtracting or stripping all or a portion of the oxygen gamma rays from the gamma rays recorded in the carbon interval, the sensitivity to oil as determined by a porosity measurement has been improved.

Test pit data was gathered, and certain fractions of the oxygen gamma rays were subtracted from the carbon gamma rays. The results of this operation were divided by the counts recorded in the oxygen interval. The resulting ratio was then multiplied by a normalization factor, designed to bring the ratio numbers back up to those of the unsubtracted carbon/oxygen ratio. This normalization factor was determined in a 35% porosity water sand by dividing the unsubtracted carbon/oxygen ratio (1.40) by the subtracted ratio. Expressing the operation mathematically, $$(C - fO/O) \times N = R_c$$

where C represents the number of gamma rays in the carbon energy interval, O represents the gamma rays in the oxygen interval, f is the fraction of the oxygen gamma rays to be subtracted, N is the normalization factor and $R_c$ is the corrected ratio.

For an indication of the response under this type of data reduction technique, FIG. 11 is indicative of test pit data which has not been corrected for downscattered gamma rays. As is obvious from the curve 150, indicative of water sand, and the curve 151, indicative of oil sand, the plot of porosity versus the ratio indicates that the curves are very close. This closeness indicates some of the problem in attempting to establish whether the sand contains oil or water.

Referring to FIG. 12, which has been corrected for the downscattering of high energy gamma rays, the curve 160 represents water sand and the curve 161 represents oil sand. Quite obviously, the sensitivity of the measurement of oil or water is improved. That is, the curves are farther apart and a given bit of data is much more easily distinguished as being either oil or water.

Referring again to FIG. 5, the output of the subtract citcuit 95 is C - Si. The output of subtract circuit 96 is O - Ca. The scaler circuit 130 determines what fraction "f" will be used to subtract off the O - Ca downscattered gamma rays. If "f" is set at 1, then the equation becomes $$\frac{(C - Si) - (O - Ca)}{O - Ca} \times N = R_c$$

Thus, the output of subtract circuit 131 is (C — Si) — (O — Ca). The ratio circuit 98 then provides $$\frac{(C - Si) - (O - Ca)}{O - Ca}.$$

This is then multiplied by the scaler circuit 132 (normalization factor) to provide a ratio which has been corrected for the effects of the downscattered oxygen gamma rays being over in the carbon energy interval.

In compiling the data shown in the graph of FIG. 12, the normalization factor was 3.73 and "f" was set at one, meaning 100% of the oxygen gamma rays were subtracted from the carbon interval. The error bars in the data in FIG. 12 are indicative of the actual data taken. The output of the scaler circuit 132 and the output of ratio circuit 97, being indicative of the Si/Ca ratio, are each recorded on recorder 24.

Referring again to FIG. 10, the energy level of high energy gamma rays is plotted versus the counts of radiation. This graph includes a first curve which is indicative of capture plus inelastic scattering gamma rays and a second curve indicative of capture gamma rays. The characteristic capture curve has a peak at 2.2 Mev, indicative of hydrogen. Silicon capture gamma rays occur between 3.27 Mev and 4.24 Mev. Calcium capture gamma rays occur between 4.90 Mev and 5.87 Mev. Even higher energy capture gamma rays, identified as being "$H_c$", are found between 5.87 Mev and approximately 8.0 Mev.

The characteristic curve of capture gamma rays and inelastic scattering gamma rays, when operating at a neutron source pulsing rate of approximately 20 KHz, indicates that carbon inelastic gamma rays occur between 3.27 Mev and 4.24 Mev and oxygen inelastic gamma rays occur between 4.90 Mev and 5.87 Mev. Carbon and oxygen have peaks outside these bands, but for this particular data, the 5.8 Mev peak for oxygen and 3.9 Mev peak for carbon were chosen. The 7.1 Mev level is indicative of iron gamma rays, which of course results primarily from the steel casing used in cased boreholes.

Figure 8:
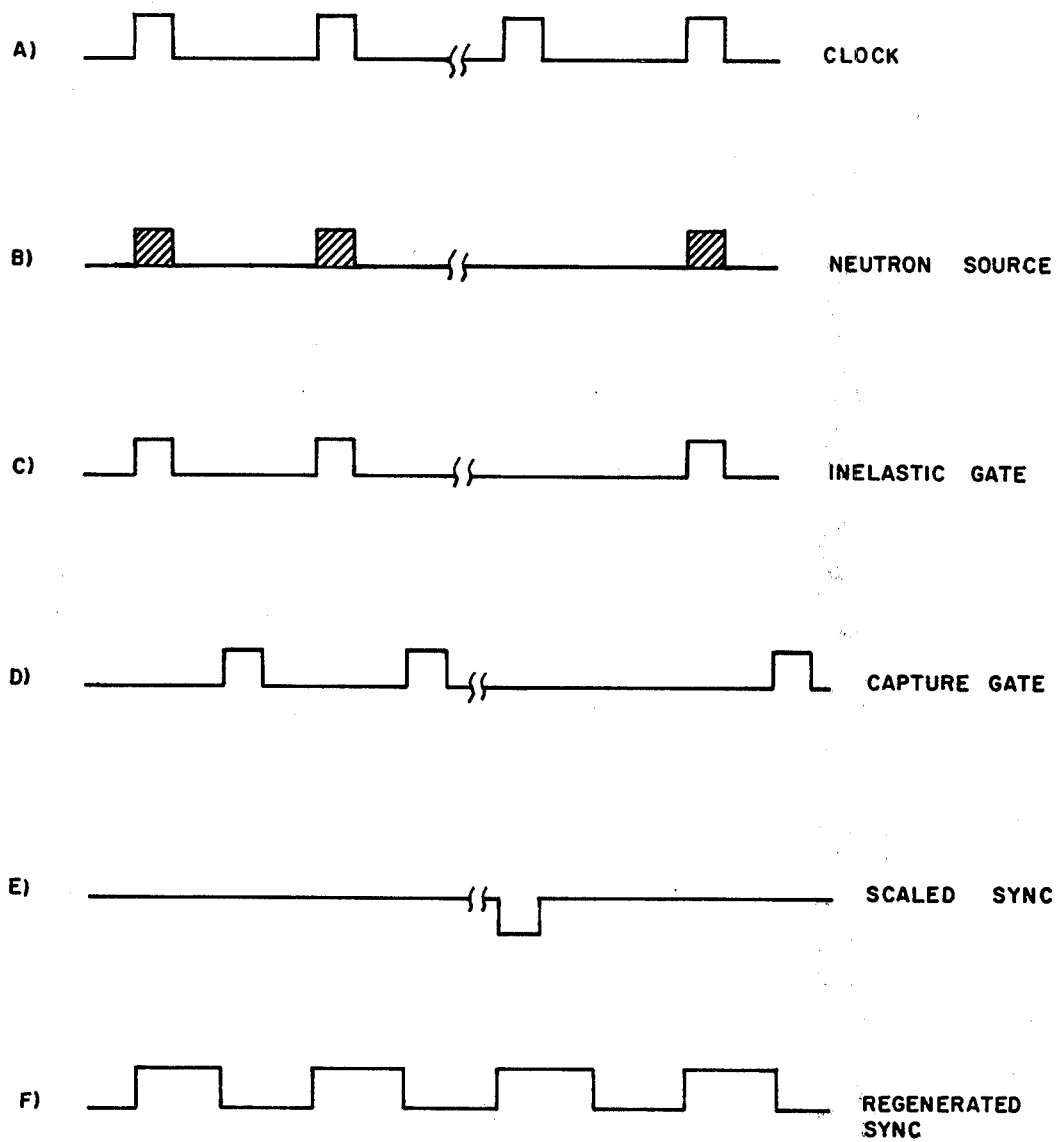

It should be appreciated that the circuitry of FIG. 5 is dependent upon having a sync signal coupled into the multichannel analyzer 90 by means of the conductor 89 to make the various address decoders accurate with respect to the detected pulses occurring in the subsurface instrument. The representative waveforms illustrated in FIG. 8 illustrate the relationship of the clock pulses in FIG. 8A to the generation of neutrons by the neutron source in FIG. 8B. The inelastic gate intervals of FIG. 8C correspond to the neutron source being turned on and the capture gate intervals are illustrated in FIG. 8D. It should be appreciated that the scaled sync pulse appearing in FIG. 8E occurs when the neutron source and the detection gates are all gated off as previously discussed. The regenerated sync signals appearing in FIG. 8F are square waves, for convenience, having a frequency corresponding to that of the clock frequency in the subsurface instrument. In the preferred embodiment, the multichannel analyzer 90 illustrated in FIG. 5 stores data in one portion of the memory when the regenerated sync 8F is high and in another portion when the sync is low.

Thus there has been described and illustrated herein a system in accordance with the present invention wherein synchronization between the surface and subsurface instrumentation is established by regenerating with a phase-locked loop the 20 KHz subsurface sync pulses which have been scaled to a lower frequency and transmitted over the logging cable. The 20 KHz signals from the phase-locked loop, in phase synchronization with the subsurface clock, controls the routing of the detector pulses in the surface signal processing system. The sync pulses are separated from the detector pulses in the sync separator and used as the reference signal for the phase-locked loop. The 20 KHz output from the phase-locked loop, the regenerated sync, controls the routing of the data signals. The detector pulses are fed into the multichannel pulse height analyzer system and the regenerated sync routes the pulses occurring in the inelastic interval into one section of the analyzer memory and the pulses occurring in the capture measure interval into another section. Circuit means have been provided in the illustrated embodiment for subtracting off at least a portion of the downscattered gamma rays from an energy band of interest. Obvious variations will occur to those skilled in the art. For example, the stripping can be done in systems not using the sync regeneration approach. It should be apparent to those skilled in the art that this system can also be used with cables having a better frequency response than the seven-conductor cable referred to hereinabove. Furthermore, although the preferred embodiment contemplates that all of the downscattered oxygen gamma rays be substracted from the carbon measuring interval, a lesser or greater fraction can be used, for example, one-half, of such downscattered oxygen gamma rays, for a particular set of circumstances. If desired, the fraction can be a variable which even changes during a logging run or during the data reduction process.

The embodiments of the invention in which an exclusive property or privilege is claimed are defined as follows:

1. A method of well logging, comprising the steps of:
irradiating the formations surrounding an earth borehole with high energy neutrons;
detecting radiations emanating from said formations resulting from said formations being irradiated by said neutrons;
generating first electrical signals based upon said detected radiations relating to the carbon content of said formations;
generating second electrical signals based upon said detected radiations relating to the oxygen content of said formations; and
generating a ratio signal $R_c$ in accordance with the relationship $$R_c = (C - fO/O),$$

where "$R_c$" is a corrected carbon/oxygen ratio,
"C" is the carbon content of said formations as determined by said first electrical signals,
"O" is the oxygen content of said formations as determined by said second electrical signals, and
"f" is the fraction of said second electrical signals subtracted from said first electrical signals.

2. A method of well logging, comprising the steps of:
irradiating the formations surrounding an earth borehole with high energy neutrons;
detecting radiations emanating from said formations resulting from said formations being irradiated by said neutrons;
generating first electrical signals based upon said detected radiations relating to the carbon content of said formations;
generating second electrical signals based upon said detected radiations relating to the oxygen content of said formations; and
generating a ratio signal $R_c$ in accordance with the relationship $$R_c = (C - fO/O) \times N$$

where "$R_c$" is a corrected carbon/oxygen ratio,
"C" is the carbon content of said formations as determined by said first electrical signals,
"O" is the oxygen content of said formations as determined by said second electrical signals,
"f" is the fraction of said second electrical signals substracted from said first electrical signals, and
"N" is a normalization factor.

3. A method of well logging, comprising the steps of:
irradiating the formations surrounding an earth borehole with high energy neutrons;
detecting radiations emanating from said formations resulting from said formations being irradiated by said neutrons;
generating first electrical signals based upon said detected radiations relating to the carbon content of said formations;
generating second electrical signals based upon said detected radiations relating to the oxygen content of said formations;
subtracting at least a fraction of said second electrical signals from said first electrical signals to thereby generate third electrical signals; and
generating a ratio of said third and said second electrical signals.

4. The method according to claim 3 wherein all of said second electrical signals are subtracted from said first electrical signals to generate said third electrical signals.

5. In a method for determining the carbon/oxygen ratio of formations surrounding an earth borehole in which said formations are irradiated with high energy neutrons, gamma radiation is detected and first and second electrical signals are generated indicative of the carbon and oxygen content, respectively, of said formation, the improvement comprising the subtraction of at least a fraction of said second electrical signals indicative of the oxygen content of said formations from the first electrical signals indicative of the carbon content of said formations to thereby generate third electrical signals, and the generation of a ratio of said third and said second electrical signals.

6. The method according to claim 5, being characterized by all of said second electrical signals being subtracted from said first electrical signals.

7. In a method for determining the carbon/oxygen ratio of formations surrounding an earth borehole in which said formations are irradiated with high energy neutrons, gamma radiation is detected and first electrical signals are generated indicative of the carbon content of said formation, the improvement comprising the generating of second electrical signals functionally related to detected gamma rays having a higher energy level than carbon and the subtracting of at least a portion of said second electrical signals from said first electrical signals.

8. The method according to claim 7 wherein said higher energy gamma rays are indicative of the oxygen content of said formation.

9. The method according to claim 8 wherein all of said second electrical signals are subtracted from said first electrical signals.

10. Apparatus for logging the formations surrounding an earth borehole, comprising:
an elongated well logging instrument adapted to traverse an earth borehole;
a source of pulsed neutrons within said instrument for irradiating the formations surrounding said borehole;
gamma radiation detector means for generating first electrical signals indicative of the carbon content of said formations and second electrical signals indicative of gamma radiation having a higher energy level than that of carbon; and
means for subtracting at least a portion of said second electrical signals from said first electrical signals.

11. The apparatus according to claim 10 wherein said second electrical signals are indicative of the oxygen content of said formations.

12. The apparatus according to claim 11, including in addition thereto, means for generating ratio signals in accordance with the following relationship:

$$R_c = (C - fO/O)$$

where "$R_c$" is the corrected ratio, "C" is functionally related to said first electrical signals, "O" is functionally related to said second electrical signals and "f" is the portion of said second electrical signals subtracted from said first electrical signals.

13. The apparatus according to claim 12 wherein "f" is one.

* * * * *